(12) United States Patent
Inoue

(10) Patent No.: US 7,386,294 B2
(45) Date of Patent: Jun. 10, 2008

(54) DEDICATED SHORT-RANGE COMMUNICATION ON-VEHICLE APPARATUS

(75) Inventor: Masahiro Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 544 days.

(21) Appl. No.: 10/769,793

(22) Filed: Feb. 3, 2004

(65) Prior Publication Data

US 2004/0203390 A1 Oct. 14, 2004

(30) Foreign Application Priority Data

Apr. 14, 2003 (JP) ............ 2003-109014

(51) Int. Cl.
*H04B 1/06* (2006.01)

(52) U.S. Cl. ............ 455/345; 455/346; 455/347; 455/569.1; 455/569.2; 343/700 MS; 343/713

(58) Field of Classification Search ............ 455/345, 455/346, 347, 569.1, 569.2; 343/700 MS, 343/713

See application file for complete search history.

(56) References Cited

U.S. PATENT DOCUMENTS

| | | | | |
|---|---|---|---|---|
| 5,295,753 | A * | 3/1994 | Godo et al. ............ | 400/612 |
| 5,485,520 | A * | 1/1996 | Chaum et al. ............ | 705/74 |
| 5,649,316 | A * | 7/1997 | Prudhomme et al. ...... | 455/345 |
| 6,396,446 | B1 * | 5/2002 | Walstra et al. ............ | 343/713 |
| 6,407,712 | B1 * | 6/2002 | Turnbull et al. ............ | 343/713 |
| 7,020,701 | B1 * | 3/2006 | Gelvin et al. ............ | 709/224 |

FOREIGN PATENT DOCUMENTS

| | | | |
|---|---|---|---|
| JP | 05-043607 | U | 6/1993 |
| JP | 05-290228 | A | 11/1993 |
| JP | 07-325996 | A | 12/1995 |
| JP | 08-1662843 | A | 6/1996 |
| JP | 08-297758 | A | 11/1996 |
| JP | 08-297761 | A | 11/1996 |
| JP | 09-035099 | A | 2/1997 |
| JP | 10-051227 | A | 2/1998 |
| JP | 11-127008 | A | 5/1999 |
| JP | 2001-060276 | A | 3/2001 |
| JP | 2001-297347 | A | 10/2001 |
| JP | 2002-198852 | A | 7/2002 |
| JP | 2002-246817 | A | 8/2002 |
| WO | 01/28113 | A1 | 4/2001 |

* cited by examiner

*Primary Examiner*—Sanh D. Phu
(74) *Attorney, Agent, or Firm*—Sughrue Mion, PLLC

(57) ABSTRACT

A dedicated short-range communication on-vehicle apparatus easily attachable on a wind shield of the motor vehicle includes an antenna, a radio module, a data processing unit and others contained in a single box-like housing. The antenna (8) has directivity in a predetermined orientation. The radio module (10) performs transmission/reception of radio wave with road-side radio equipment through the antenna (8). The data processing unit (11) processes data transferred through the radio module (10). The box-like housing (4) houses the antenna (8), the radio module (10) and the data processing unit (11) en bloc. The box-like housing (4) is fixedly attached onto a windshield (3) of the motor vehicle at a mounting plate (4*a*) of the housing (4) on the antenna radiation side by an adhesive member (30). A radio wave aperture portion of the mounting plate (4*a*) is made of a radio wave transmissible material.

16 Claims, 11 Drawing Sheets

DEDICATED SHORT-RANGE COMMUNICATION ON-VEHICLE APPARATUS

BACKGROUND OF THE INVENTION

1. Field of the Invention

The present invention relates generally to a short-range communication system. In particular, in the dedicated short-range communication system, the present invention relates to a short-range communication apparatus which is destined to be mounted on a motor vehicle. More particularly, the present invention is concerned with a dedicated short-range communication on-vehicle apparatus which can be mounted or stuck on a windshield of a motor vehicle by making a mounting plate of the on-vehicle apparatus on the side for radiation of antenna from a radio wave transmissible material while adjusting the directivity of the antenna.

2. Description of Related Art

The dedicated short-range communication system (i.e., system dedicated for short-range communicator, also referred to as DSRC system for short) is designed for performing radio communication only within a limited range on a road by making use of radio wave of a microwave band. In such system, radio communication is carried out between an on-road apparatus (i.e., short-range communication apparatus installed on a road) and an on-vehicle apparatus (i.e., a short-range communication apparatus installed on a motor vehicle) for the purpose of transferring various types of data with a view to realizing such services as toll collection, presentation of traffic information and others, profitably for the drivers of motor vehicles and managers who are in charge of controlling of roads, parking spaces and others.

As the systems designed for performing such short-range communication, there have been conceived various and numerous applications such as exemplified by toll collections at gas stations, drive-throughs and the like and presentation of traffic information as well as the electronic toll collection (ETC for short), needless to say.

In the dedicated short-range communication system mentioned above, a dedicated short-range communication on-vehicle apparatus is mounted on the motor vehicle, which apparatus is designed for conducting short-range communication with road-side radio equipment installed on the road side through the medium of radio wave.

In general, the dedicated short-range communication on-vehicle apparatus employed in such dedicated short-range communication system is comprised of an antenna having the directivity in a predetermined direction, a radio module for performing transmission/reception of radio wave with road-side radio equipment through the antenna, and a data processing unit for processing the transmission/reception data transmitted/received by the radio module. As to the data processing unit among others, this unit has generally been combined integrally with a car navigation system installed in a dashboard of the motor vehicle in many applications. Of course, the motor vehicle must be then equipped with the car navigation system.

Heretofore, the dedicated short-range communication on-vehicle apparatus has been installed on a dashboard of the motor vehicle. However, the dedicated short-range communication on-vehicle apparatus mounted on the dashboard provides an obstacle to the view field. Besides, there exists a desire for making the dashboard aesthetically neat. For these reasons, there has been a demand for installing the dedicated short-range communication on-vehicle apparatus at another position.

Under the circumstances, such arrangement of the dedicated short-range communication on-vehicle apparatus has already been proposed that only the antenna or alternatively only the antenna and the radio module are mounted on the windshield of the motor vehicle. For more particular, reference may have to be made to Japanese Patent Application Laid-Open Publication No. 297758/1996 (JP-A-H8-27758), pp. 2 to 3, FIG. 3.

Further, as to the orientation (direction) of the directivity (boresight direction) of the antenna in the dedicated short-range communication on-vehicle apparatus, it is prescribed in the relevant mounting standards that the antenna should be directed with an angle of inclination in a range of 0 to 30 degrees (°) with reference to the forward direction of the motor vehicle, wherein the zenith direction is defined to be 0 degree with inclination in the forward direction being affixed with a sign "plus or +" while inclination in the backward direction is of a sign "minus or −".

In conjunction with the dedicated short-range communication on-vehicle apparatus designed to be installed in combination with the car navigation system as mentioned previously, there has existed a demand for the apparatus of a unitary structure designed to realize only the functions of the dedicated short-range communication on-vehicle apparatus so that the dedicated short-range communication on-vehicle apparatus can also be employed in the motor vehicles which are not equipped with the car navigation system.

Certainly, the dedicated short-range communication on-vehicle apparatus of the type designed to be mounted optionally on the motor vehicle which is not equipped with the car navigation system has been implemented in the unitary structure which can be installed to be mounted on the dashboard of the motor vehicle, which apparatus however involves a problem mentioned below.

Namely, in the case where the dedicated short-range communication on-vehicle apparatus destined to be installed on the dashboard of the motor vehicle is stuck on the windshield as it is so that the view field is not obstructed, then the orientation (direction) of directivity of the antenna will incline excessively in the forward direction of the motor vehicle, rendering the on-vehicle apparatus useless because inclination of the windshield of the motor vehicle (direction normal to the windshield, e.g. 50 degrees (°) when the windshield plane is vertical as in the case of a four-wheel drive vehicle) is usually within the range of 25 degrees to 50 degrees.

SUMMARY OF THE INVENTION

In the light of the state of the art described above, it is as an object of the present invention to provide a dedicated short-range communication on-vehicle apparatus which incorporates components such as an antenna, a radio module, a data processing unit and others in a single box-like housing so that the dedicated short-range communication on-vehicle apparatus can easily be used by sticking or attaching it on a windshield of the motor vehicle, to thereby solve the problems mentioned above.

In view of the above and other objects which will become apparent as the description proceeds, there is provided according to a general aspect of the present invention a dedicated short-range communication on-vehicle apparatus which is mounted on a motor vehicle in a dedicated short-range communication system for an intelligent traffic system.

The apparatus mentioned above includes an antenna having directivity in a predetermined direction, a radio module for performing transmission/reception of radio wave with road-side radio equipment by way of the antenna, a data processing unit for processing transmission/reception data transmitted/received by the radio module, and a box-like housing for housing therein the antenna, the radio module and the data processing unit in a unitary structure.

The box-like housing is adapted to be fixedly attached onto a windshield of the motor vehicle with a mounting plate being disposed on the radiation side of the antenna by means of an adhesive member. At least a radio wave aperture portion of the mounting plate of the box-like housing is made of a radio wave transmissible material.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
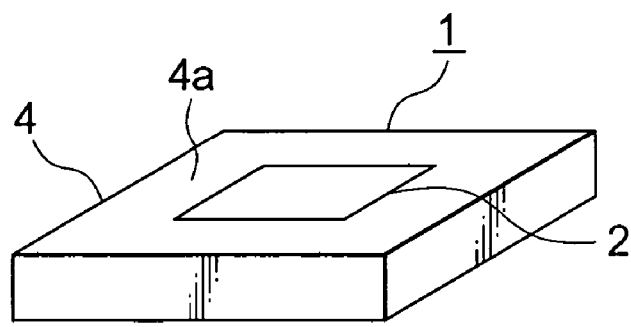
FIG. 1 is a perspective view showing an outer appearance of a dedicated short-range communication on-vehicle apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "vertical", "horizontal", "rear", "back" and the like are words of convenience and are not to be construed as limiting terms.

Embodiment 1

Figure 2:
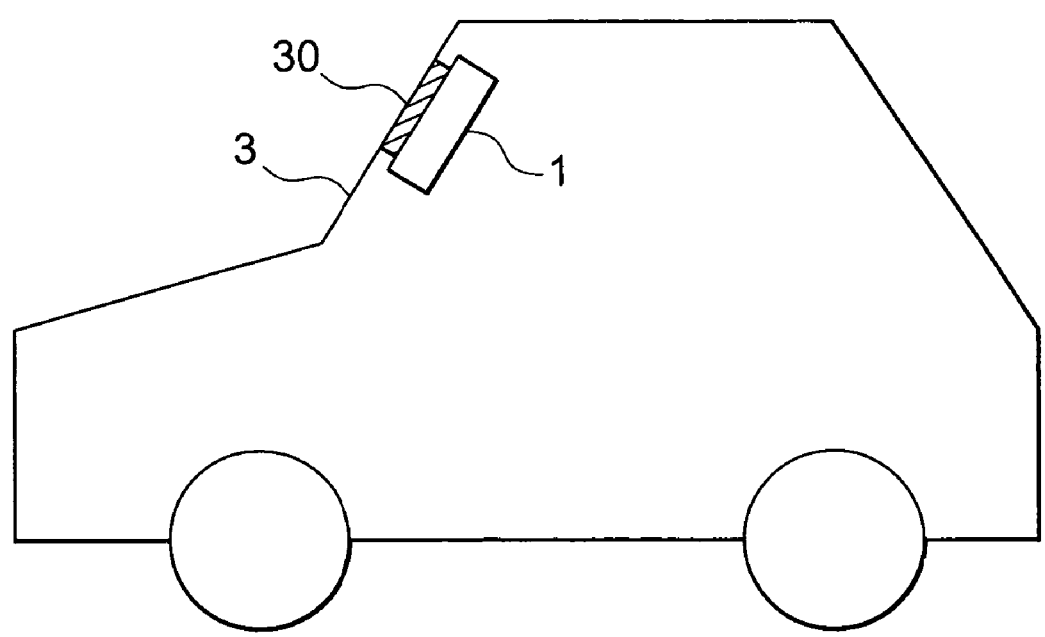
FIG. 2 is a sectional view for illustrating a state in which the dedicated short-range communication on-vehicle apparatus according to the first embodiment of the invention is bonded onto a windshield of a motor vehicle.

FIG. 1 is a perspective view showing an outer appearance of the dedicated short-range communication on-vehicle apparatus (DSRC on-vehicle apparatus) according to a first embodiment of the present invention. FIG. 2 is a sectional view for illustrating a state in which the dedicated short-range communication on-vehicle apparatus according to the instant embodiment of the invention is attached or stuck on a windshield (front glass shield) of an automobile or motor vehicle. Referring to FIG. 1, the dedicated short-range communication on-vehicle apparatus denoted generally by reference numeral 1 includes a box-like housing 4 of a thin rectangular parallelepiped form. Disposed internally within the box-like housing 4 are an antenna having the directivity in a predetermined direction or orientation (described hereinafter), a radio module for performing transmission/reception of radio waves with road-side radio equipment by way of the antenna (described later on), a data processing unit for processing transmission/reception data transmitted and received by the radio module (also described later on).

Of six sheets of boards or plates constituting the box-like housing 4 of the rectangular parallelepiped form, the surface of the attached or plate stuck onto be bonded or adhered to a windshield of the motor vehicle serves as a mounting plate surface 4a. Of the box-like housing 4, the plate on which the mounting surface 4a is formed is made of a radio wave transmissible material so that the radio wave transmission/reception through the antenna (not shown) encounters no interference or obstacle.

In the dedicated short-range communication on-vehicle apparatus according to the instant embodiment of the invention, the whole surface portion 4a of the mounting plate of the box-like housing 4 is made of the radio wave transmissible material. However, the invention is never restricted to such structure. It is sufficient that at least a radio wave aperture portion of the mounting plate for the antenna is formed of the radio wave transmissible material. Of course, it goes without saying that the whole box-like housing 4 may be made of the radio wave transmissible material.

A stick-on position mark 2 is provided on the mounting plate surface 4a of the box-like housing 4 for indicating the stick-on position of a double-side adhesive tape for mounting or sticking of the dedicated short-range communication on-vehicle apparatus 1 on the windshield of the motor vehicle. In the case of the dedicated short-range communication on-vehicle apparatus according to the instant embodiment of the invention, the stick-on position mark 2 is in the form of a line frame depicted on the surface of the box-like housing 4. However, the present invention is never restricted thereto. A concavo-convex portion may be provided on the mounting plate surface 4a to serve as the stick-on position mark 2 or a printed matter may be pasted onto the mounting plate surface 4a to serve as the stick-on position mark. At this juncture, it should however be mentioned that the stick-on position mark 2 indicating the stick-on position of the double-side adhesive tape be provided at the location which does not overlap the front surface of the built-in antenna (not shown) with a view to evading obstruction of the radio transmission/reception through the antenna. Owing to such measures, the user is positively prevented from bonding or adhering the double-side adhesive tape at such location where the radio wave transmission/reception through the antenna is obstructed.

On the other hand, it is noted that such position that obstructs or interferes the transmission/reception through the antenna can not be avoided although it depends on the type of the on-vehicle apparatus. In that case, adjustment of the antenna is performed so that the predetermined transmission/reception can be effected even in the case where the double-side adhesive tape is stuck on the stick-on region as set or secured.

Referring to FIG. 2, the dedicated short-range communication on-vehicle apparatus 1 is adhered or stuck on the windshield 3 through the medium of the double-side adhesive tape 30 at the position or location where the field of view spreading backward from a rearview mirror (so-called back mirror) is not interfered or obstructed. Incidentally, although it has been described that the double-side adhesive tape 30 is used as the adhesive material in the case of the dedicated short-range communication on-vehicle apparatus according to the instant embodiment of the invention, the present invention is never restricted to the use of the double-side adhesive tape. For example, an adhesive or the like which can be stripped off may be made use of.

The dedicated short-range communication on-vehicle apparatus 1 of the structure described above is comprised of the antenna having directivity in a predetermined orientation or direction, the radio module for performing transmission/reception of radio wave with the road-side radio equipment by way of the antenna, the data processing unit for processing transmission/reception data transmitted/received by the radio module, and the box-like housing 4 for housing therein the antenna, the radio module and the data processing unit in a unitary structure. The box-like housing 4 is adapted to be fixedly secured on the windshield 3 of the motor vehicle at the mounting plate surface 4a on the radiation side of the antenna by means of the double-side adhesive tape 30 serving as the adhesive member, wherein at least the radio wave aperture portion on the mounting plate surface side is made of the radio wave transmissible material. Thus, all the structural components constituting the dedicated short-range communication on-vehicle apparatus 1 are contained internally of the single box-like housing 4, which means in turn that the handling of the dedicated short-range communication on-vehicle apparatus can be facilitated regardless of whether a car navigation system is installed or not and that the dedicated short-range communication on-vehicle apparatus can be mounted or installed on the windshield 3 of the motor vehicle with ease, to great advantages. Besides, the dashboard of the automobile or the motor vehicle can be made aesthetically neat.

Embodiment 2

Figure 3:
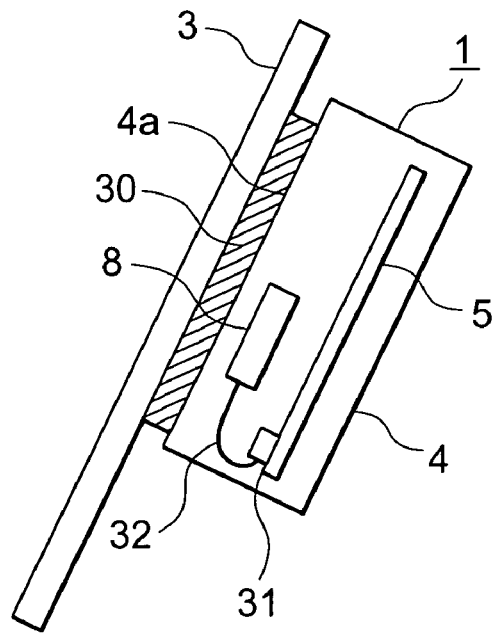
FIG. 3 is a sectional view showing a dedicated short-range communication on-vehicle apparatus according to a second embodiment of the present invention in the state where the dedicated short-range communication on-vehicle apparatus is stuck on the windshield of a motor vehicle.
Figure 4:
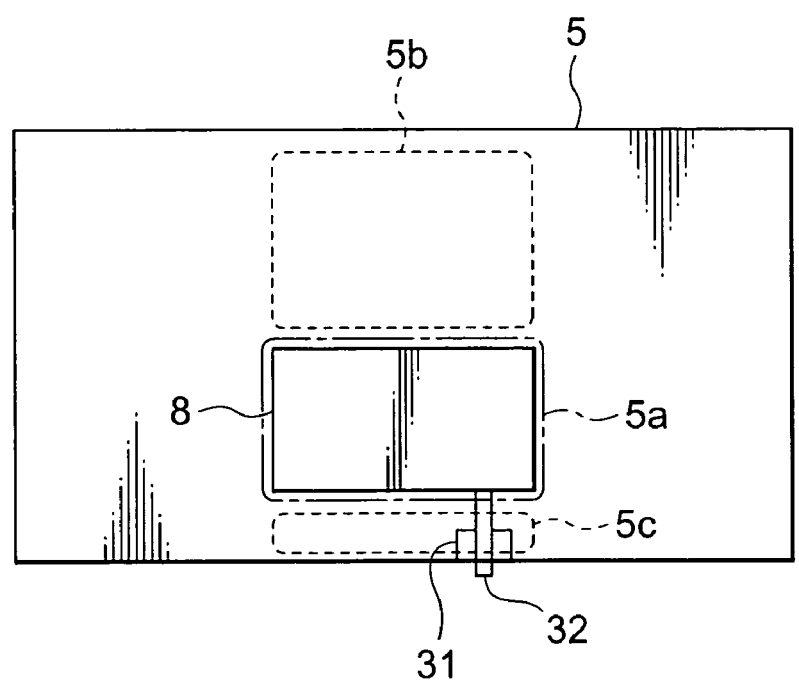
FIG. 4 is a front view showing internal components of the dedicated short-range communication on-vehicle apparatus according to the second embodiment of the invention.

FIG. 3 is a sectional view showing the dedicated short-range communication on-vehicle apparatus according to a second embodiment of the present invention in the state where the dedicated short-range communication on-vehicle apparatus is adhered to or stuck on the windshield of a motor vehicle. FIG. 4 is a front view showing internal constituents of the dedicated short-range communication on-vehicle apparatus according to the second embodiment of the invention. Incidentally, it should be mentioned that the internal constituents or components are mounted such that top portions thereof as viewed in FIG. 4 are located or disposed above. Referring to FIGS. 3 and 4, the dedicated short-range communication on-vehicle apparatus 1 according to the instant embodiment of the invention is comprised of a substrate (circuit board) 5 which constitutes a major part of the dedicated short-range communication on-vehicle apparatus 1 and a flat plate-like antenna 8 disposed in parallel with the substrate 5. The antenna 8 is implemented as a ceramic antenna exhibiting directivity, wherein the directivity of the antenna (boresight direction) is orientated toward the windshield 3 of the motor vehicle.

Disposed on the substrate (i.e., circuit board) 5 are a radio module (not shown) for performing transmission/reception of the radio wave (i.e., transfer of radio data) with road-side radio equipment (not shown either) by way of an antenna 8 and a data processing unit for processing transferred with data transmitted/received by the radio module. The antenna 8 and the circuit board or substrate 5 are interconnected through the medium of a high-frequency connector 31 and a high-frequency cable 32.

The antenna 8 includes an antenna transmissive planar region 5a which is transmissive in the direction orthogonal to the plane of the circuit board or substrate 5. In this conjunction, it is to be noted that the area of an upper substrate surface region 5b located above the antenna transmissive planer region 5a is greater than a lower substrate surface region 5c which is located beneath the antenna transmissive surface region 5a. By varying or changing the areas of the upper and lower substrate surface regions relative to the antenna transmissive planar region 5a, the directivity of the antenna 8 can be inclined toward the substrate region of the larger area. This will be explained below.

Figure 5A:
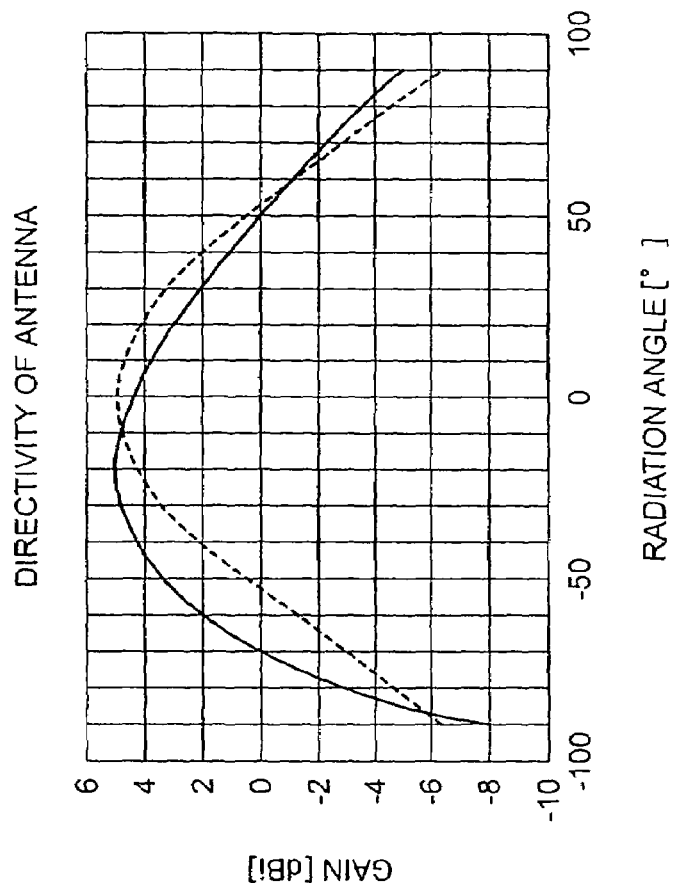
FIG. 5A is a view for graphically illustrating in what manner the directivity of an antenna changes in the second embodiment of the invention.
Figure 5B:
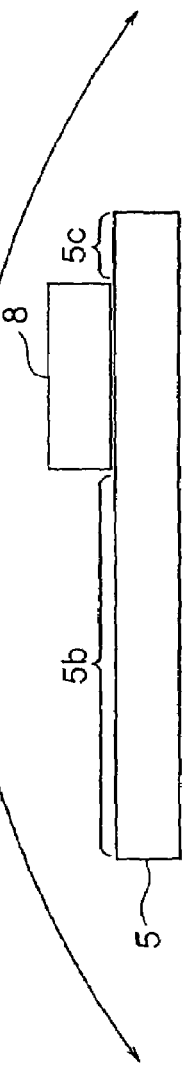
FIG. 5B is another view for graphically illustrating in what manner the directivity of the antenna changes in the second embodiment of the invention.

FIGS. 5A and 5B are views for illustrating in what manner the directivity of the antenna changes. As is shown in FIG. 5B, in the case where the antenna 8 is disposed on the circuit board or substrate 5 at a position near to one end or side thereof, the directivity inclines toward the adjacent substrate surface region having a greater area relative to the antenna 8. More specifically, the directivity inclines toward the region of greater area in which the ground pattern of the substrate exists. Ordinarily, electric circuits such as integrated circuits and like are formed on the substrate. As the consequence, the directivity inclines toward the substrate surface region in which the ground pattern exists, inclusive of the ground pattern itself, need to say. FIG. 5A is a view for graphically illustrating a manner in which the directivity of the antenna changes. In FIG. 5A, the radiation angle of the antenna is taken along the abscissa with the gain of the antenna being taken along the ordinate. In FIG. 5A, a broken-line curve represents a change of the directivity in the case where the areas of both the substrate surface regions adjacent to the antenna are equivalent to each other, wherein the peak of radiation angle is located at the position of 0° (zero degree). In other words, orientation (direction) of the directivity of the antenna (i.e., boresight direction) lies along the normal relative to the primary surface or plane of the antenna.

On the other hand, profile of the solid line curve shown in FIG. 5A correspondingly represents to the positional relation between the antenna 8 and the substrate (circuit board) 5 shown in FIG. 5B. As can be seen in FIG. 5A, orientation or gradient of the directivity of the antenna 8 (i.e., the boresight direction) is inclined about 20 degrees toward the substrate surface region of the greater area.

As described hereinbefore, inclination of the windshield of the motor vehicle or car lies ordinarily within a range of 25 to 50 degrees. Accordingly, corrective modification of the orientation or gradient of the directivity orientation of the antenna 8 in the upward direction by about 20 degrees, as described above in conjunction with the instant embodiment of the invention, is functionally equivalent to the mounting of the ordinary antenna at an angle of 5 to 30 degrees, satisfying substantially prescription of the mounting standards as imposed. Parenthetically, when the orientation (direction) of the directivity of the antenna 8 is to be further inclined, this can be achieved by varying or modifying correspondingly the ratio between the areas of the substrate surface regions mentioned above.

Figure 9:
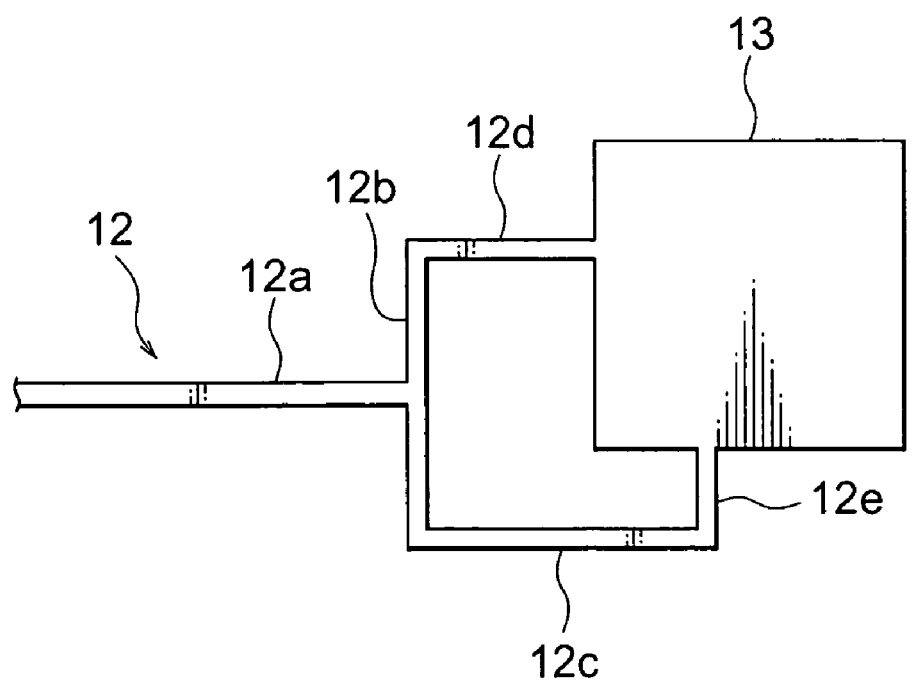
FIG. 9 is a view showing a micro-strip antenna and a feeder line pattern formed on the substrate in the fifth embodiment of the invention.

In the dedicated short-range communication on-vehicle apparatus 1 of the structure which includes the substrate 5 on which the radio module and the data processing unit are mounted, as described above, when the antenna 8 is so set to be transmissible in the direction orthogonal to the substrate, it is possible to properly correct orientation (direction) of the directivity of the antenna 8 in the upward direction since the substrate surface region 5b located above the antenna transmissive planar region 5a has the greater area when compared with the substrate surface region 5c located beneath the antenna transmissive planar region 5a, as viewed in FIG. 9. Thus, the dedicated short-range communication on-vehicle apparatus 1 can be mounted on the windshield 3 of the motor vehicle with ease without need for employing the mounting bracket for correcting or modifying the mounting angle. Furthermore, the dedicated short-range communication on-vehicle apparatus can easily be manufactured since there is no need for making the box-like housing 4 partially in a slanted shape or making the box-like housing 4 slanted interiorly. Besides, the dedicated short-range communication on-vehicle apparatus 1 can be fabricated in a thin structure as well.

Embodiment 3

Figure 6:
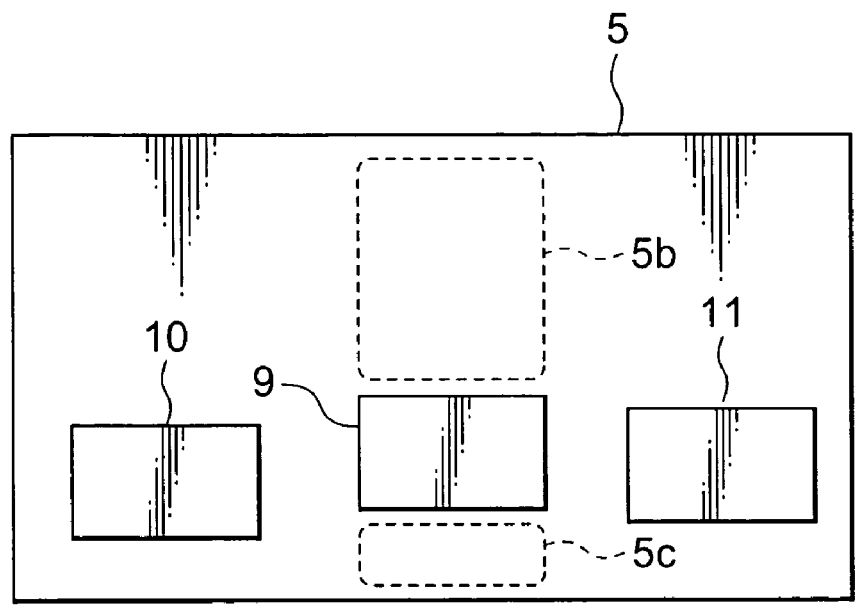
FIG. 6 is a front view showing internal components of the dedicated short-range communication on-vehicle apparatus according to a third embodiment of the present invention.

FIG. 6 is a front view showing internal constituents or components of the dedicated short-range communication on-vehicle apparatus according to a third embodiment of the present invention. At this juncture, it should be added that in FIG. 6, the internal components are mounted with top portions thereof being located atop, as viewed in the figure. It is to be noted that in the dedicated short-range communication on-vehicle apparatus according to the instant embodiment of the invention an antenna denoted by 9 is implemented on the substrate (circuit board) 5 in the form of a micro-strip antenna. In addition, a radio module 10 designed for performing transmission/reception of radio waves with the road-side radio equipment (not shown) by way of the antenna 9 and the data processing unit 11 for processing data transmitted and received by the radio module 10 are formed on the substrate 5. To say in another way, in the dedicated short-range communication on-vehicle apparatus according to the instant embodiment of the invention, the antenna 9, the radio module 10 and the data processing unit 11 are formed on one and the same substrate 5. With regard to the other respects, the structure of the dedicated short-range communication on-vehicle apparatus according to the instant embodiment of the invention is essentially identical with the one according to the first embodiment.

Concerning the area occupied by the antenna 9 on the substrate 5, the area of a substrate surface region 5b located above the antenna 9 is selected to be larger than that of a substrate surface region 5c located below the antenna 9. By changing the areas of the substrate surface regions above and below the antenna 9 in this manner, the directivity of the antenna 9 can be inclined toward the substrate surface region of the greater area.

In the dedicated short-range communication on-vehicle apparatus of the structure in which the antenna 9, the radio module 10 and the data processing unit 11 are mounted on one and the same substrate with the area of the substrate surface region 5b located above the antenna 9 being selected larger than the substrate surface region 5c located below the antenna 9, there can be obtained advantageous effects similar to those of the dedicated short-range communication on-vehicle apparatus according to the first embodiment of the invention while the high-frequency connector 31 and the high-frequency cable 32 employed for interconnecting the antenna 8 and the substrate 5 in the dedicated short-range communication on-vehicle apparatus according to the first embodiment can be spared, whereby the dedicated short-range on-vehicle apparatus according to the instant embodiment of the invention can be manufacture at lower cost.

Embodiment 4

Figure 7:
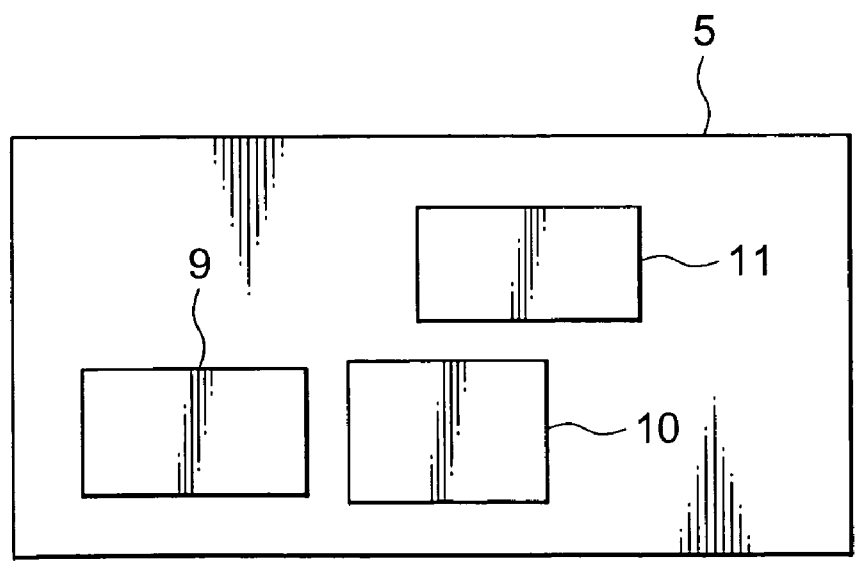
FIG. 7 is a front view showing internal components of the dedicated short-range communication on-vehicle apparatus according to a fourth embodiment of the present invention.

FIG. 7 is a front view showing internal constituents or components of the dedicated short-range communication on-vehicle apparatus according to a fourth embodiment of the present invention. At this juncture, it should be mentioned that in FIG. 7, the internal components are mounted with tip portions thereof being located atop, as viewed in the figure. In the dedicated short-range communication on-vehicle apparatus according to the instant embodiment of the invention, the antenna 9 realized in the form of a micro-strip antenna is formed on the substrate 5. More specifically, the antenna 9 is formed at one end or side portion of the substrate 5 as viewed in the horizontal direction thereof in FIG. 7. The radio module 10 and the data processing unit 11 are formed in other regions on the substrate 5.

In general, the components or parts to be disposed peripherally of the antenna should preferably or ideally be those whose heights from the surface of the substrate are small, because then the radiation characteristics of the antenna can assume values closer to the calculation value. Heretofore, when the dedicated short-range communication on-vehicle apparatus is installed on the dashboard, it is required to orientate the directivity of the antenna in the zenith direction, which means that the antenna has to be disposed at or in the vicinity of the mid portion of the substrate so that the antenna is surrounded by the substrate surface regions each of substantially same area. Further, when the antenna is disposed at or near the center of the substrate, all the other circuit parts or components have to be disposed around the antenna while taking into consideration the heights of all the parts or components. By contrast, in the dedicated short-range communication on-vehicle apparatus according to the instant embodiment of the invention, the antenna 9 is so disposed that no other parts or components exist in the substrate surface regions above and below the antenna 9. The same hold true in the dedicated short-range communication on-vehicle apparatuses according to the other embodiments of the invention. For this reason, it is sufficient to take into consideration only the heights of the circuit parts which are to be disposed in the horizontal direction relative to the antenna 9.

Further, when the directivity of the antenna 9 is to be positively inclined on either sides in the horizontal direction, this can easily be accomplished by disposing the antenna 9 on the substrate 5 at either one end or side portion as viewed in the horizontal direction in FIG. 7 so that the areas of the substrates located adjacent to the region of the antenna 9 on the left and right sides thereof become different from each other. As the result of this, the directivity of the antenna 9 can be inclined to the direction in which the area of the substrate is larger.

In the dedicated short-range communication on-vehicle apparatus of the structure described above, the antenna 9 is mounted on the substrate at either one end portion thereof as viewed in the horizontal direction. By virtue of this feature, the degree of freedom of disposition of the constituent parts on the substrate can be increased, which in turn means that the dedicated short-range communication on-vehicle apparatus can be implemented in a miniature size at low manufacturing cost.

Embodiment 5

Figure 8:
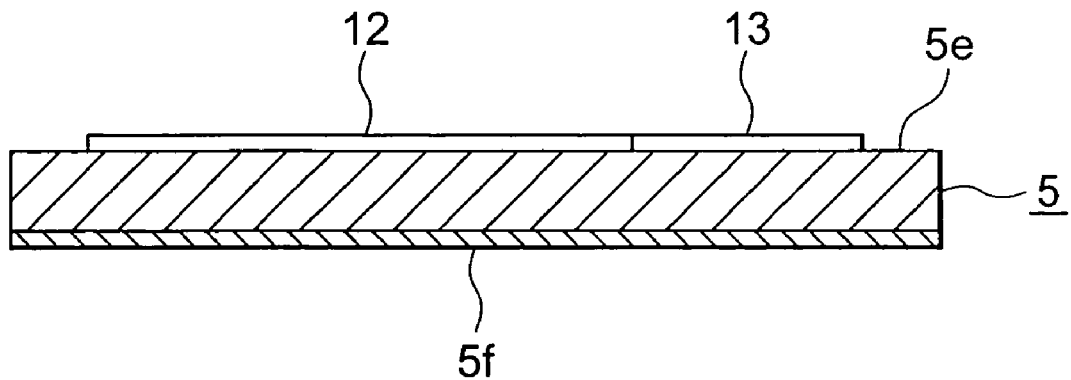
FIG. 8 is a sectional view showing a substrate (circuit board) of the dedicated short-range communication on-vehicle apparatus according to a fifth embodiment of the present invention.

FIG. 8 is a sectional view showing a substrate (circuit board) of the dedicated short-range communication on-vehicle apparatus according to a fifth embodiment of the present invention. FIG. 9 is a view showing a micro-strip antenna and a feeder line pattern formed on the substrate. As can be seen in FIGS. 8 and 9, the substrate 5 is composed of a dielectric layer 5e and a ground layer 5f stacked in a laminated structure. Provided on the surface of the substrate 5 which is to face the windshield of the motor vehicle are an antenna 13 realized in the form of a micro-strip antenna and a feeder line 12 serving as an electric power supply means for supplying or feeding electric energy to the antenna 13.

Referring to FIG. 9, the feeder line generally denoted by reference numeral 12 is comprised of a strip line 12a of 50 Ω to which a power amplifier (not shown) is connected, branched strip lines 12b and 12c each of 50 Ω which are branched from the strip line 12a, respectively, for dividing the electric power fed from the strip line 12a by two (i.e., −3 dB) and impedance matching lines 12d and 12e, respectively.

The branched strip lines 12b and 12c are formed with such difference in respect to the line length that the phase difference therebetween becomes 90 degrees by changing, correspondingly, the lengths of the branched strip lines 12b and 12c from the branching point for the purpose of generating the circular polarization. In many practical applications, the length of the impedance matching lines 12d and 12e are each $\lambda/4$ and implemented as the strip line having such characteristic impedance that impedance matching can be ensured between the input impedance to the antenna 13 and the feeder line impedances of the branched strip lines 12b and 12c. The impedance and hence the width of the feeder line is determined in dependence on the dielectric constants and thicknesses of the ground layer 5f, the dielectric layer 5e and other parameters.

The size of the micro-strip antenna 13 is determined in dependence on the dielectric constants, the thicknesses of the ground layer 5f, the dielectric layer 5e and other factors, as in the case of the feeder line 12. Since present invention is not directly concerned with the method of calculating the sizes or dimensions of the antenna, description of such method will be unnecessary.

In the dedicated short-range communication on-vehicle apparatus implemented in the structure described above, the antenna is constituted by the micro-strip antenna 13 formed or deposited on the substrate or circuit board 5. Thus, by forming the antenna 13 on the same substrate on which the radio module 10 and the data processing unit 11 are formed, very low-cost apparatus dedicated for the short-range communication (DSRC) can be realized because the cost for the antenna such as ceramic antenna or the like can be spared.

Embodiment 6

Figure 10:
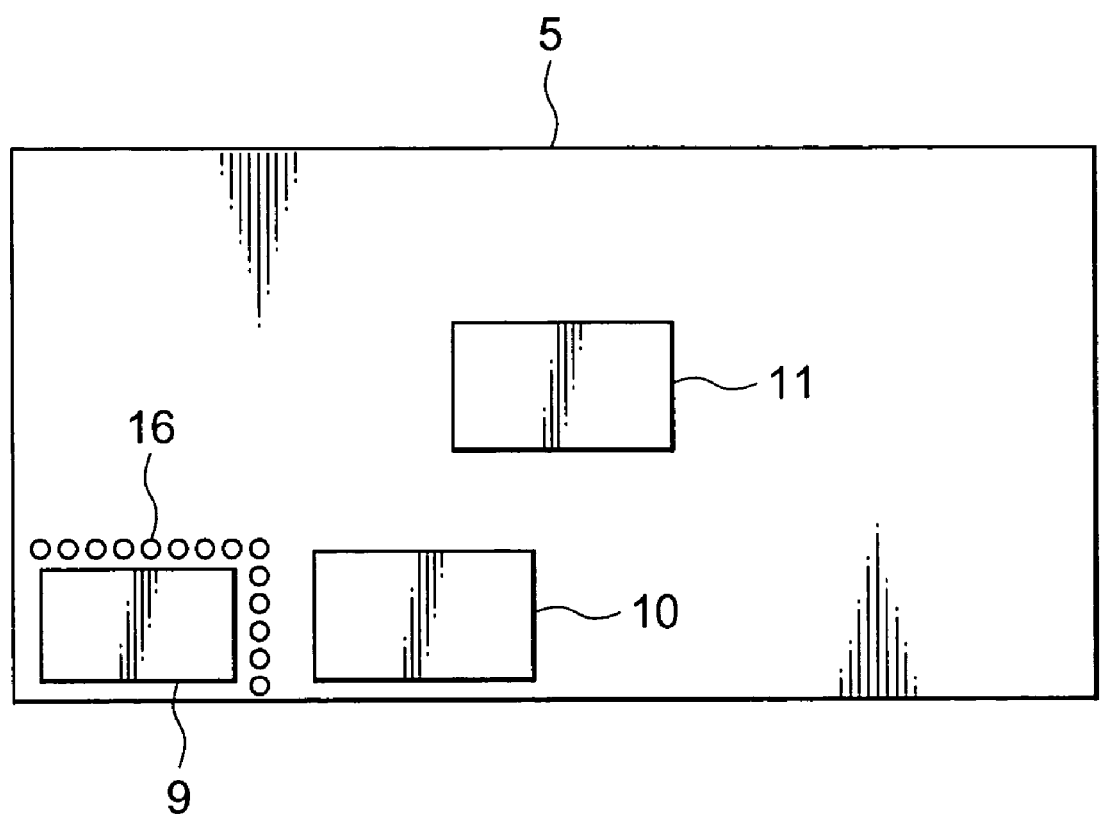
FIG. 10 is a front view showing internal components of the dedicated short-range communication on-vehicle apparatus according to a sixth embodiment of the present invention.

FIG. 10 is a front view showing internal components of the dedicated short-range communication on-vehicle apparatus according to a sixth embodiment of the present invention. Parenthetically, the internal components mentioned above are mounted with top portions thereof being positioned atop as viewed in FIG. 10. According to the teachings of the invention incarnated in the instant embodiment, the antenna 9 constituted by the micro-strip antenna is formed on the substrate 5 at one end or side portion of the substrate 5, as viewed in the horizontal direction. A plurality of through holes 16 are formed in the substrate 5 so as to surround peripherally the antenna 9. More specifically, the through holes 16 are formed in two linear arrays orthogonally to each other along two sides of the antenna 9, respectively, which sides are not located adjacent to the edge portions of the substrate 5.

Intensity of the electric field distribution of the antenna 9 is highest at patch end portions thereof. Accordingly, the antenna characteristic is most susceptible to the influence of the status prevailing around the patch end portions. It is further noted that the electric field of the antenna 9 leaks into the substrate 5 through some patch portions to be consumed as heat, which means that the antenna efficiency deteriorates correspondingly. For coping with these problems, the through holes 16 are formed around the antenna 9 as described previously. By virtue of this arrangement, leakage of the electric field into the substrate 5 can be reduced, whereby the antenna efficiency can be enhanced. Further, the electric field is closed by the through holes 16 along the patch sides. Thus, the electric field of the antenna 9 is less susceptible to the influence of the components or parts or circuitries disposed in the vicinity of the antenna. Preferably, the through holes 16 should be disposed as close as possible to one another with the distance between the adjacent through holes being shorter than λ/4 inclusive. By disposing the through holes closely to one another to a possible maximum, leakage of the electric field into the substrate can be reduced with correspondingly enhanced effectiveness.

In this conjunction, it should be added that in the dedicated short-range communication on-vehicle apparatus in which the micro-strip antenna 9 is disposed substantially centrally as viewed in the horizontal direction, it is preferred to dispose three linear arrays of through holes 16, respectively, along three sides of the antenna except for the side located adjacent to the side of the substrate.

As is apparent from the above description, since a plurality of through holes 16 are formed at positions surrounding the outer peripheral edges or sides of the antenna 9 in the dedicated short-range communication on-vehicle apparatus according to the instant embodiment of the invention, the degree of freedom in disposing the component or constituent parts on the substrate 5 can be enhanced, as a result of which the dedicated short-range communication on-vehicle apparatus can be realized in a remarkably reduced size. Besides, cost involved in manufacturing the dedicated short-range communication on-vehicle apparatus can equally be reduced.

Embodiment 7

Figure 11:
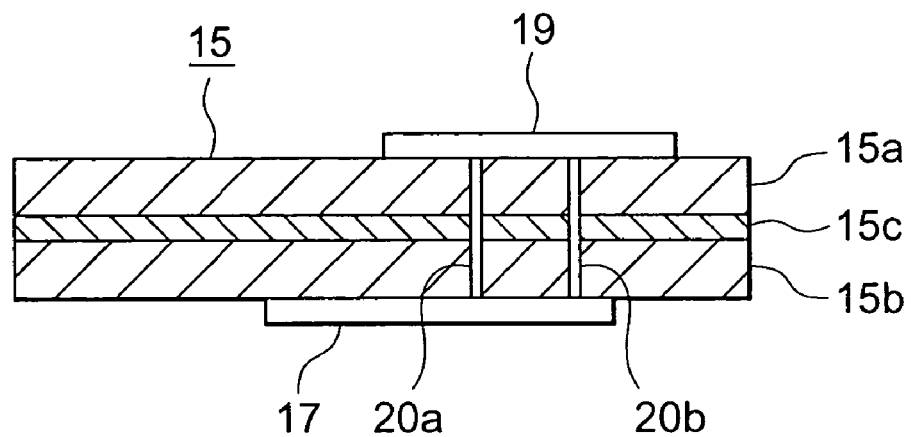
FIG. 11 is a sectional view of a substrate for illustrating the structure of a dedicated short-range communication on-vehicle apparatus according to a seventh embodiment of the present invention.
Figure 12:
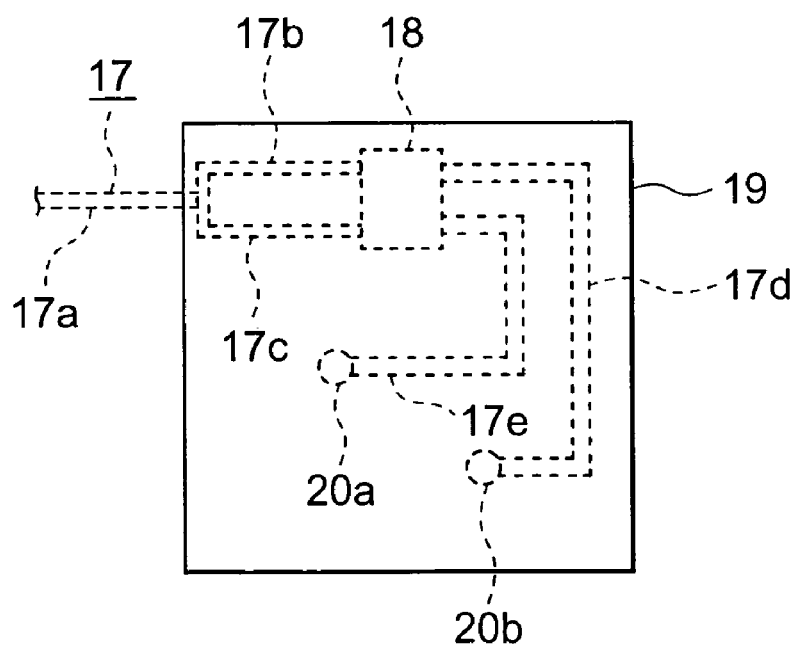
FIG. 12 is a view showing a micro-strip antenna formed in the substrate and a feeder line pattern formed on a back or rear side (opposite side) of the substrate in the seventh embodiment of the invention.

FIG. 11 is a sectional view of a substrate for illustrating the structure of a dedicated short-range communication on-vehicle apparatus according to a seventh embodiment of the present invention. FIG. 12 is a view showing a micro-strip antenna formed in the substrate and a feeder line pattern formed on a back or rear side (opposite side) of the substrate. As can be seen in FIG. 11, a substrate 15 is constituted by a pair of dielectric layers 15a and 15b and a ground layer 15c which is sandwiched between both the dielectric layers 15a and 15b. The layers 15a, 15b and 15c are stacked in a laminated structure. Provided on the surface of the substrate 15 which faces the windshield of the motor vehicle is an antenna 19 which is realized in the form of a micro-strip antenna. On the other hand, provided on the back or rear surface of the substrate 15 which is opposite to the antenna 19 is a feeder line 17 serving as the electric power supply means for supplying electric power to the antenna 19. The antenna 19 and the feeder line 17 are interconnected through the medium of through holes 20a and 20b extending through the substrate assembly 15.

As is shown in FIG. 12, the feeder line denoted generally by reference numeral 17 includes a strip line 17a of 50 Ω to which a power amplifier (not shown) is connected, branched strip lines 17d and 17e each of 50 Ω which are branched from the strip line 17a and impedance matching lines 17b and 17c, respectively. The lines 17b and 17c are constituted by strip lines having characteristic impedances which match with those of the branched strip lines 17d and 17e, respectively. The length of each of the impedance matching lines 17b and 17c is λ/4, and when the line of 50 Ω described above is branched, the branched strip line 17d; 17e is constituted by the strip line having the characteristic impedance of 70.7 Ω.

The branched strip lines 17d and 17e are each constituted by the strip line of 50 Ω serving for the function equivalent to the branched strip lines 12b and 12c described hereinbefore by reference to FIG. 9. The lengths of the branched strip lines 17d and 17e from the branch point are made different such that the phase difference becomes 90 degrees in order to effectuate the circular polarization.

The size of the micro-strip antenna 19 is determined on the basis of the conditions such as the dielectric constant, thickness and others of the ground layer 15c and the dielectric layers 15a and 15b, similarly to the case of the feeder line. Feeding points (through hole) 20a and 20b are formed at intermediate portions of the antenna 19, wherein the impedance is determined by the dimension or distance from the center. The intensity of the electric field at the center portion of the antenna 19 is zero with impedance being zero as well, wherein impedance increases progressively at locations closer to the end or side of the antenna. At the feeding points 20a and 20b, impedance should be zero.

In the dedicated short-range communication on-vehicle apparatus according to the instant embodiment of the invention, the substrate 15 is implemented in a multi-layer structure, as described above, wherein the ground layer 15c is made use of as the ground micro-strip circuit for both the antenna 19 and the feeder line 17.

A resistor 18 is provided for the purpose of ensuring isolation between the feeder lines, and the resistance value thereof is selected to be 100 Ω for the branching with impedance of 50 Ω. The resistor 18 serves for absorbing reflected waves from the feeding points 20a and 20b.

Difference of the feeder line length between the branched strip lines 17d and 17e is λ/4 (90 degrees) in terms of phase difference, whereas that of the resistor 18 is twice as high, i.e., λ/2 (180 degrees). Thus, the reflected waves at the feeding points 20a and 20b cancel out each other, whereby effectiveness of the isolation can further be enhanced.

Moreover, since the surface forming the antenna 19 and the feeder line 17 are disposed oppositely to each other on the stack composed of the dielectric layers 15a and 15b between which the ground layer 15c is sandwiched, the isolation between the antenna 19 and the feeder line 17 can be increased when compared with the structure in which the surface forming the antenna 19 and the feeder line 17 are formed on the same plane. Owing to this feature, the characteristics of the antenna 19 such as the axial ratio and others can be improved.

In dependence on the disposition of the strip lines 17a and 17b for the antenna 19, right-hand circular polarization or left-hand circular polarization is determined. However, since the polarization generating method as well as methods of calculating the sizes or dimensions of the components are irrelevant to the subject matter of the present invention, description of these methods will be unnecessary.

Incidentally, although it has been described that in the dedicated short-range communication on-vehicle apparatus according to the instant embodiment of the invention, the line branching is made with impedance of 50 Ω. It should however be understood that this is only by way of example. Impedance can be changed appropriately by changing correspondingly the feeding positions for the strip lines 17a and 17b and the widths of the resistor 18 and the strip lines 17a to 17e, respectively.

In the dedicated short-range communication on-vehicle apparatus of the structure or arrangement described above, the substrate 15 is implemented in the form of a multi-layer substrate, wherein the antenna feeder line 17 is provided on the substrate surface opposite to that for the antenna 19. Thus, the area of the substrate 15 can be decreased with a result that the dedicated short-range communication on-vehicle apparatus can further be miniaturized and manufactured at low cost. Besides, isolation between the antenna feeder line 17 and the antenna 19 can be ensured, whereby the antenna characteristics can be enhanced.

Embodiment 8

Figure 13:
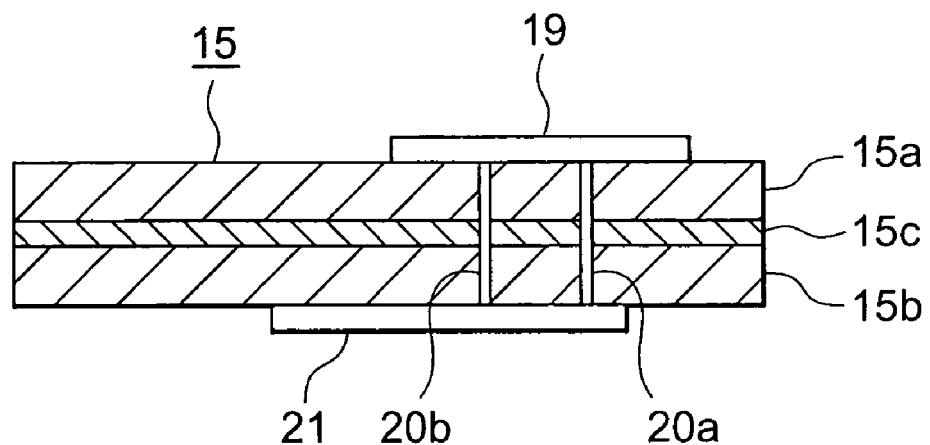
FIG. 13 is a sectional view of a substrate structure for illustrating the dedicated short-range communication on-vehicle apparatus according to an eighth embodiment of the present invention.
Figure 14:
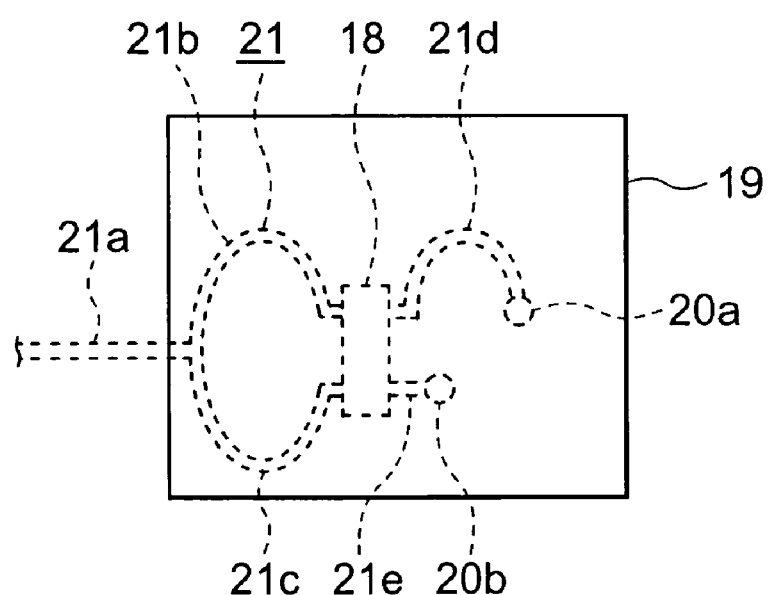
FIG. 14 is a view showing a micro-strip antenna formed on the substrate and a feeder line pattern formed on the back or rear side (opposite side) of the substrate in the eighth embodiment of the invention.

FIG. 13 is a sectional view of a substrate structure for illustrating a dedicated short-range communication on-vehicle apparatus according to an eighth embodiment of the present invention. FIG. 14 is a view showing a micro-strip antenna formed in the substrate and a feeder line pattern formed on the back or rear side (opposite side) of the substrate. As can be seen in FIG. 13, the substrate 15 includes two dielectric layers 15*a* and 15*b* and a ground layer 15*c* which is sandwiched between both the dielectric layers 15*a* and 15*b*. The layers 15*a*, 15*c* and 15*b* are stacked in a laminated structure. Provided on the top surface of the substrate 15 which faces the windshield of the motor vehicle is an antenna 19 realized in the form of a micro-strip antenna. Besides, provided on the surface of the substrate 15 which is opposite to the antenna 19 is a feeder line generally denoted by reference numeral 21 and serving as the electric power supply means for supplying electric power to the antenna 19. The antenna 19 and the feeder line 21 are interconnected through the medium of through holes 20*a* and 20*b* extending through the substrate 15.

The strip lines 21*a*, 21*b*, 21*c*, 21*d* and 21*e* of the dedicated short-range communication on-vehicle apparatus according to the instant embodiment of the invention serve for utterly same functions as the strip lines 17*a*, 17*b*, 17*c*, 17*d* and 17*e* in the dedicated short-range communication on-vehicle apparatus according to the seventh embodiment of the invention.

In the case of the dedicated short-range communication on-vehicle apparatus according to the seventh embodiment of the invention, the strip lines 17*b* and 17*c* on one hand and the strip lines 17*d* and 17*e* on the other hand are disposed in parallel and in close vicinity to each other. Consequently, there will take place inter-line couplings between these strip lines. When such inter-line coupling occurs, the phase difference of 90 degrees and the uniform distribution performance required for these feeder lines undergo deterioration, which in turn results in degradation of the antenna characteristics. With a view to tackling this problem, the invention incarnated in the instant embodiment teaches the use of the feeder lines each of a semicircle so that the feeder lines are mutually distanced as far as possible.

In the dedicated short-range communication on-vehicle apparatus of the structure described above, a pair of feeder lines destined for supplying the electric power to the antenna 19 are formed arcuately in the direction in which the distance between these feeder lines increases. By virtue of this arrangement, the inter-line coupling can be reduced to a possible minimum, whereby the phase difference of 90° and the uniform distribution performance required for the feeder lines can be enhanced. Thus, the antenna of enhanced and improved performances can be obtained.

At this juncture, it should however be mentioned that the feeder lines are not necessarily formed arcuately. However, the arcuate formation of the feeder lines is preferred because the specific impedance of the line becomes then constant (impedance is uniform owing to absence of bent or doubled portion), which contributes to further improvement of the performances of the antenna. Besides, the feeder lines can easily be fabricated with a uniform width.

Embodiment 9

Figure 15:
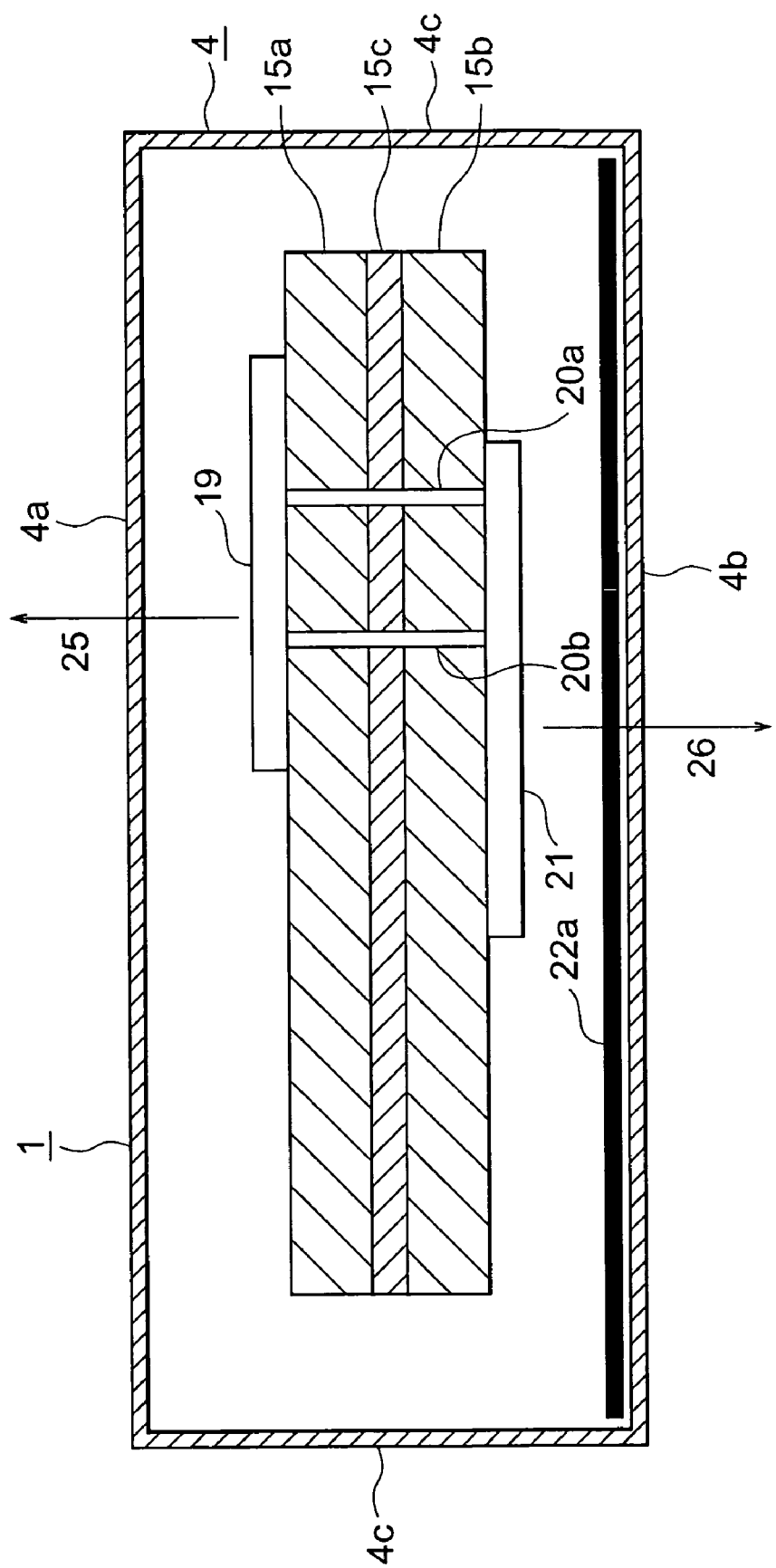
FIG. 15 is a sectional view showing a structure of a dedicated short-range communication on-vehicle apparatus according to a ninth embodiment of the present invention.

FIG. 15 is a sectional view showing a structure of a dedicated short-range communication on-vehicle apparatus according to a ninth embodiment of the present invention. In the case of the apparatus according to the instant embodiment of the invention, an electrically conductive member 22*a* is disposed on an inner surface of a back or rear plate 4*b* of the box-like housing 4 which is disposed oppositely to the orientation (direction) of the directivity (boresight direction) of the antenna 19 disposed internally of the box-like housing 4.

Gain of the antenna 19 in the back lobe direction (indicated by an arrow 26 in FIG. 15) is certainly extremely small when compared with the gain in the boresight direction (indicated by an arrow 25). However, the antenna 19 has the gain also in the back lobe direction although the value thereof is very small. Accordingly, the electrically conductive member 22*a* is provided for the purpose of directing or orienting the radio wave radiated in the back lobe direction to the boresight direction by reflecting the radio wave.

In general, in the case when the radio wave is circularly polarized, the radio wave polarized in the back lobe direction is left-handed polarized wave when the polarization in the boresight direction is right-handed circularly polarized wave. Further, the radio wave of circular polarization has such characteristic that the direction of polarization is reversed upon single reflection in such manner that the right-handed polarized wave is inverted to the left-handed polarized wave or vice versa.

On the other hand, the right-handed polarized wave is used in the short-range communication. Accordingly, the polarization radiated in the back lobe direction is left-handed polarized wave. In the dedicated short-range communication on-vehicle apparatus according to the instant embodiment of the invention, the left-handed polarized wave radiated in the back lobe direction (26) is radiated backwardly in the directivity orientation direction (boresight direction) 25 as the right-handed polarized wave after having been reflected by the electrically conductive member 22*a*. By virtue of this feature, gain of the antenna 19 can further be improved.

Embodiment 10

Figure 16:
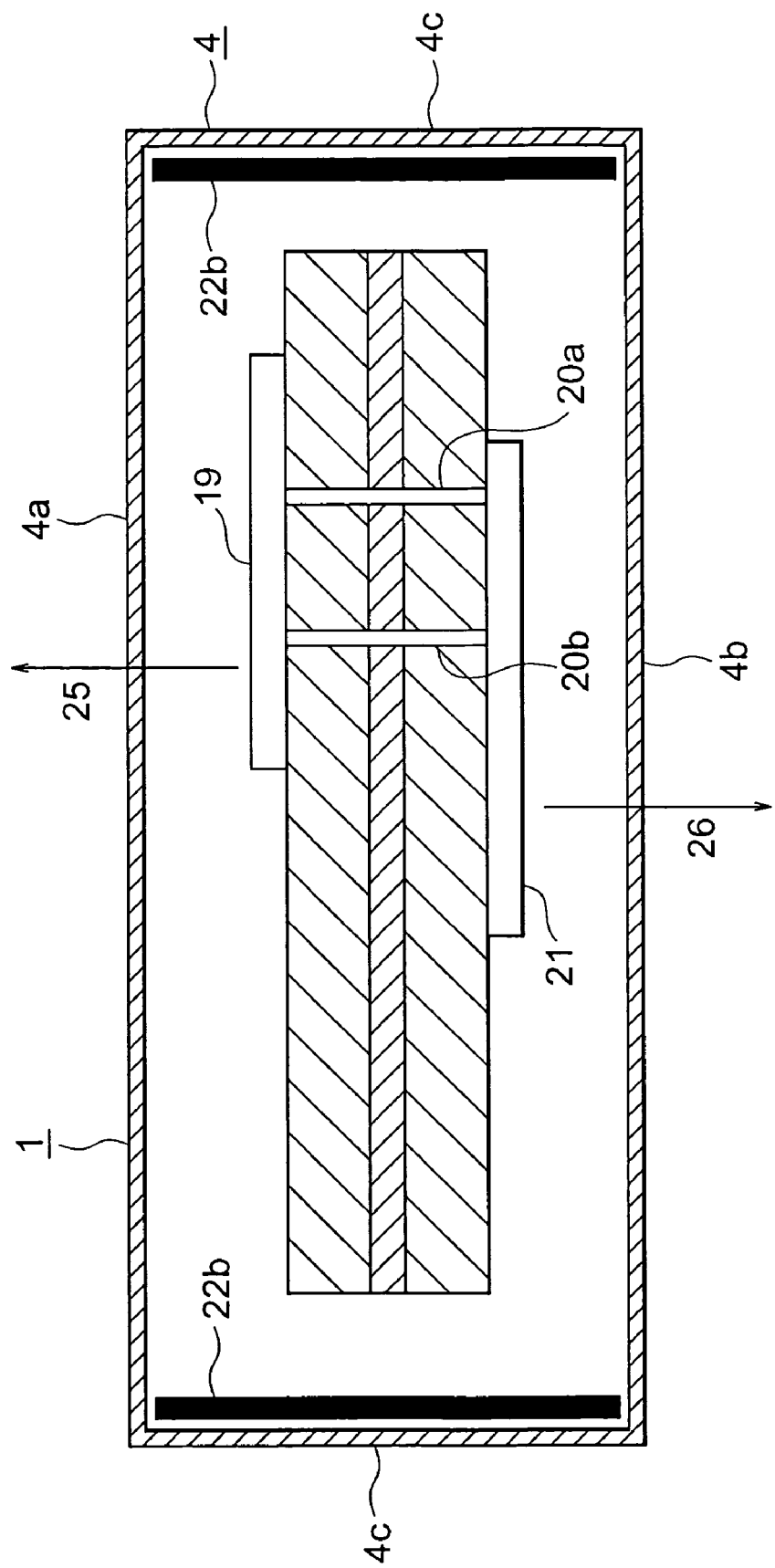
FIG. 16 is a sectional view showing a structure of a dedicated short-range communication on-vehicle apparatus according to a tenth embodiment of the present invention.

FIG. 16 is a sectional view showing a structure of a dedicated short-range communication on-vehicle apparatus according to a tenth embodiment of the present invention. In the case of the apparatus according to the instant embodiment of the invention, electrically conductive members 22*b* are disposed on inner peripheral surfaces of the housing located in opposition to the outer peripheral portions, respectively, of the substrate 15 disposed internally of the box-like housing 4.

The directivity of the dedicated short-range communication antenna is predetermined by the standards. More specifically, it is recommended or regulated that gain at the half-power angle not smaller than 60° (degrees), i.e., radiation angle at which gain lowers by 3 dB is not smaller than 60°, and gain at ±90° lowers greater than 5 dB inclusive from the peak gain.

As the antenna which satisfies the standard or regulations mentioned above, there is ordinarily employed a so-called one-patch antenna. In such one-patch antenna, the directivity spreads when the peripheral substrate surface region is narrow or small. Thus, in the case where the antenna 19 is disposed at an end or side portion of the substrate 15, there may arise such possibility that the standard that the gain at ±90° must lower by 5 dB or more than the peak gain can not be satisfied. Of course, by forming the antenna beams by using a plurality of patches, gain can certainly be enhanced and thus the gain standard or regulation for ±90° can easily be satisfied. In that case, however, there arises such possibility that the half-power angle does not meet the standard because the directivity becomes narrower.

Such being the circumstances, in the dedicated short-range communication on-vehicle apparatus according to the instant embodiment of the invention, the electrically conductive members 22b are disposed all over the inner surfaces of four side walls or plates 4c of the box-like housing 4 for causing the electric waves in the directions of ±90° to be reflected for thereby suppressing the radiation in the directions of ±90°. Further, by disposing the electrically conductive member 22b at the position of λ/4 from the end or edge of the antenna 19, the phase difference between the radio wave radiated from the antenna 19 and the reflective wave reflected from the electrically conductive member 22b becomes 180 degrees to cancel out each other, whereby the gain damping effect at ±90° can further be enhanced.

As a combination of the dedicated short-range communication on-vehicle apparatus according to the instant embodiment of the invention with that of the ninth embodiment of the invention, the electrically conductive members may be disposed over the whole region of the inner peripheral surfaces of the box-like housing 4 except for the region for ensuring the orientation (direction) of the directivity of the antenna 19 disposed internally of the box-like housing 4. Owing to such combination, there can be realized the dedicated short-range communication on-vehicle apparatus which can enjoy the advantageous effects of both the ninth and tenth embodiments of the present invention.

Embodiment 11

Figure 17:
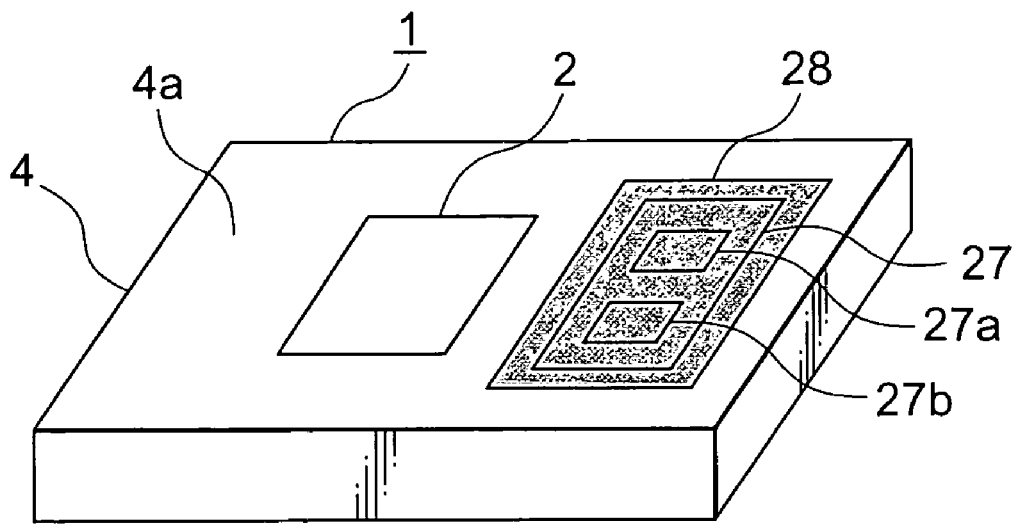
FIG. 17 is a perspective view showing an outer appearance of a dedicated short-range communication on-vehicle apparatus according to an eleventh embodiment of the present invention.

FIG. 17 is a perspective view showing an outer appearance of the dedicated short-range communication on-vehicle apparatus according to an eleventh embodiment of the present invention. In the dedicated short-range communication on-vehicle apparatus according to this embodiment of the invention, a label 27 carrying a model name or a technical regulations conformity certification number 27a, a manufacturer name 27b, etc., is affixed to the mounting plate surface 4a of the box-like housing 4 at a position adjacent to a stick-on position mark 2 indicating the stick-on position of the double-side adhesive tape. A semitransparent seal 28 is affixed on the label 27.

In conjunction with pasting of the label such as of the model name and others, the mounting plate surface is invisible from the user. Accordingly, the label has heretofore been attached on the side of the box-like housing of the on-vehicle apparatus facing the vehicle body. In the on-vehicle apparatus according to the instant embodiment of the invention which is designed to be affixed to the windshield, it is not preferable from the aesthetical viewpoint to affix the label on the surface of the box-like housing exposed in the compartment of the motor vehicle. Accordingly, in the case of the apparatus according to the instant embodiment of the invention, the label 27 is pasted also on the mounting plate surface 4a positioned on the windshield as before. In that case, the label 27 is visible through the windshield, which is not aesthetically preferable. Further, in view of the fact that the substrate material of the label 27 is ordinarily silver or white, such a problem may arise that the decorative or artistic property of the label is impaired by reflection of solar rays or the like.

For coping with the problem mentioned above, in the dedicated short-range communication on-vehicle apparatus according to the instant embodiment of the invention, the semitransparent seal 28 of the same color as the box-like housing 4 is pasted over the label 27 to thereby make the label unobtrusive or quiet, preferably from the standpoint of the design. Further, by using the semitransparent seal 28, the information such as the model name, etc. printed on the label 27 can easily be read. Further, the seal 28 should preferably be capable of being stripped off so that it can be used repetitively. In that case, characters are usually covered with a tape which is stripped off, as occasion requires, for example, for confirming the contents of the contents of description. Of course, the tape is then stuck on again. Further, since the label 27 is semitransparent, contents of the description on the label 27 can equally be checked by reading.

Embodiment 12

Figure 18:
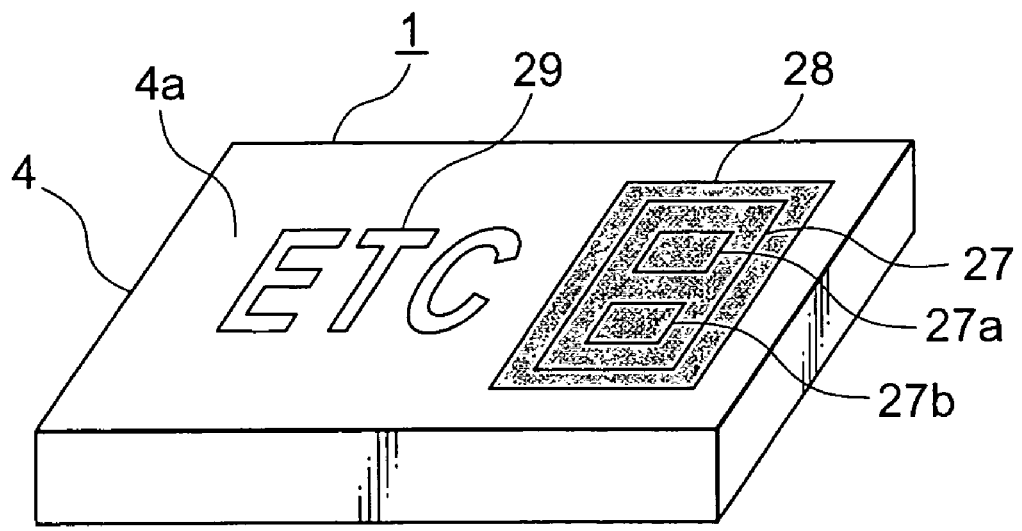
FIG. 18 is a perspective view showing an outer appearance of the dedicated short-range communication on-vehicle apparatus according to a twelfth embodiment of the present invention.

FIG. 18 is a perspective view showing an outer appearance of the dedicated short-range communication on-vehicle apparatus according to a twelfth embodiment of the present invention. The dedicated short-range communication on-vehicle apparatus according to the instant embodiment of the invention is designed to be stuck on the windshield of a motor vehicle by using a double-side adhesive tape 29 cut out in a character (string) pattern such as "ETC" or the like. It is very difficult to definitely discriminate whether or not a motor vehicle of concern is equipped with the dedicated short-range communication on-vehicle apparatus from the outside of the motor vehicle. Under the circumstances, there may arise such unpleasant situation that the motor vehicle equipped with the dedicated short-range communication on-vehicle apparatus which tries to pass through a short-range communication lane together with an ordinary motor vehicle equipped with no dedicated short-range communication on-vehicle apparatus is called to halt by a receptor mistaking for the fee receivable car. For this reason, some motor vehicles have a character string seal such as "ETC" or the like stuck on the windshield heretofore.

By contrast, in the case of the dedicated short-range communication on-vehicle apparatus according to the instant embodiment of the invention, the dedicated short-range communication on-vehicle apparatus is mounted by using the double-side adhesive tape 29 which is cut out in the form of a character string pattern indicating that the motor vehicle is equipped with the dedicated short-range communication on-vehicle apparatus. Thus, the motor vehicle can be discerned at first glance from the outside of the motor vehicle that the vehicle is equipped with the dedicated short-range communication on-vehicle apparatus, and thus the unpleasant situation such as mentioned above can be evaded.

By the way, similar effect can be obtained by printing the character string such as "ETC" and the like on the stick-on position mark 2.

Further, the double-side adhesive tape of the character string such as "ETC" or the like may be colored in red, blue or the like. In that case, the character string becomes more remarkable, whereby the effect mentioned above can be enhanced.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A dedicated short-range communication on-vehicle apparatus mounted on a motor vehicle in a dedicated short-range communication system for an intelligent traffic system, comprising:
    an antenna having directivity in a predetermined direction;
    a radio module for performing transmission/reception of radio wave with road-side radio equipment by way of said antenna;
    a data processing unit for processing transmission/reception data transmitted/received by said radio module; and
    a box-like housing for housing therein said antenna, said radio module and said data processing unit in a unitary structure,
    wherein said box-like housing is adapted to be fixedly attached onto a windshield of the motor vehicle with a mounting plate being disposed on the radiation side of said antenna by means of an adhesive member, and
    wherein at least a radio wave aperture portion of said mounting plate is made of a radio wave transmissible material,
    said dedicated short-range communication on-vehicle apparatus further comprising a substrate on which at least one of said radio module and said data processing unit is mounted,
    wherein when said antenna is so set as to be transmissible in a direction orthogonal to said substrate, a substrate surface region located above an antenna transmissive planar region is greater than a substrate surface region located beneath said antenna transmissive planar region.

2. A dedicated short-range communication on-vehicle apparatus mounted on a motor vehicle in a dedicated short-range communication system for an intelligent traffic system, comprising:
    an antenna having directivity in a predetermined direction;
    a radio module for performing transmission/reception of radio wave with road-side radio equipment by way of said antenna;
    a data processing unit for processing transmission/reception data transmitted/received by said radio module; and
    a box-like housing for housing therein said antenna, said radio module and said data processing unit in a unitary structure,
    wherein said box-like housing is adapted to be fixedly attached onto a windshield of the motor vehicle with a mounting plate being disposed on the radiation side of said antenna by means of an adhesive member,
    wherein at least a radio wave aperture portion of said mounting plate is made of a radio wave transmissible material, and
    wherein said antenna, said radio module and said data processing unit are mounted on one and the same substrate, and wherein the area of a substrate surface region located above said antenna is selected greater than a substrate surface region located below said antenna.

3. A dedicated short-range communication on-vehicle apparatus according to claim 2,
    wherein said antenna is mounted on said substrate at either one end portion thereof as viewed in horizontal direction of said substrate.

4. A dedicated short-range communication on-vehicle apparatus according to claim 2,
    wherein said antenna is constituted by a micro-strip antenna formed on said substrate.

5. A dedicated short-range communication on-vehicle apparatus according to claim 2,
    wherein a plurality of through holes are formed at positions surrounding outer peripheral edges of said antenna on said substrate.

6. A dedicated short-range communication on-vehicle apparatus according to claim 2,
    wherein said substrate is implemented in the form of a multi-layer substrate, wherein said antenna feeder line is provided on the surface opposite to that for said antenna.

7. A dedicated short-range communication on-vehicle apparatus according to claim 2,
    wherein a pair of feeder lines destined for supplying electric power to said antenna are formed accurately in the direction in which a distance between these feeder lines increases.

8. A dedicated short-range communication on-vehicle apparatus according to claim 1,
    wherein electrically conductive member is disposed on an inner peripheral surface of said box-like housing except for a region corresponding to orientation of directivity of said antenna disposed internally of said box-like housing.

9. A dedicated short-range communication on-vehicle apparatus according to claim 8,
    wherein said electrically conductive member is disposed on an inner peripheral surface located oppositely to the orientation directivity of said antenna disposed internally of said box-like housing.

10. A dedicated short-range communication on-vehicle apparatus according to claim 8,
    wherein said electrically conductive member are disposed on said inner peripheral surface of said box-like housing located oppositely to outer peripheral portions of a substrate disposed internally of said box-like housing.

11. A dedicated short-range communication on-vehicle apparatus mounted on a motor vehicle in a dedicated short-range communication system for an intelligent traffic system, comprising:
    an antenna having directivity in a predetermined direction;
    a radio module for performing transmission/reception of radio wave with road-side radio equipment by way of said antenna;
    a data processing unit for processing transmission/reception data transmitted/received by said radio module; and
    a box-like housing for housing therein said antenna, said radio module and said data processing unit in a unitary structure,
    wherein said box-like housing is adapted to be fixedly attached onto a windshield of the motor vehicle with a mounting plate being disposed on the radiation side of said antenna by means of an adhesive member, and
    wherein at least a radio wave aperture portion of said mounting plate is made of a radio wave transmissible material, said dedicated short-range communication on-vehicle apparatus further comprising:

a label carrying predetermined information and designed to be stuck on said mounting plate; and a seal stuck on said mounting plate so as to cover said label.

12. A dedicated short-range communication on-vehicle apparatus according to claim 11, wherein said seal is a semitransparent seal.

13. A dedicated short-range communication on-vehicle apparatus according to claim 11, wherein said seal is capable of being pealed off to be used repetitively.

14. A dedicated short-range communication on-vehicle apparatus according to claim 1, wherein said adhesive member is constituted by a double-side adhesive tape shaped in a predetermined character pattern.

15. A dedicated short-range communication on-vehicle apparatus according to claim 14, wherein said double-side adhesive tape is colored.

16. The dedicated short-range communication on-vehicle apparatus according to claim 8, wherein said electrically conductive member is disposed at least on an entire side of an inner peripheral surface of said box-like housing.

* * * * *